United States Patent Office 3,679,565
Patented July 25, 1972

3,679,565
PROCESS FOR ELECTROLYTIC TREATMENT OF LIQUORS USING PRESSURE CELL WITH POROUS ELECTRODE MEANS
Allan E. Gilchrist, Westlake, Ohio, assignor to SCM Corporation, Cleveland, Ohio
Continuation-in-part of applications Ser. No. 76,311, Sept. 28, 1970, Ser. No. 91,905, Nov. 23, 1970, and Ser. No. 94,267, Dec. 2, 1970. This application July 27, 1971, Ser. No. 166,436
Int. Cl. B01k 5/00, 5/02; C23b 13/00
U.S. Cl. 204—180 R
15 Claims

ABSTRACT OF THE DISCLOSURE

Shown is an improved pressure cell process and apparatus for treating feed liquor bearing dissolved electrolyte and providing, from a bath thereof with a pair of D.C. electrodes immersed therein at a minimum deposition voltage $V_1$ across said electrodes, a fluent electrodeposit on one of said electrodes, which electrodeposit has electrical conductivity lower than that of the bath, e.g., resin, oil, slime, or gel. The apparatus is for sustained operation at a voltage above $V_1$, and it comprises opposed electrodes disposed apart in a casing for forming an electrical cell zone therebetween, at least one of such electrodes being a deposition electrode for attraction of said fluent electrodeposit, at least one of such electrodes being a relatively grossly microporous product discharge electrode that forms a boundary area for said zone, the thickness of such product discharge electrode providing substantial electrical field constriction of its passageways to substances of like charge, an inlet to said zone for continuous supply of feed liquor thereto, an outlet from said zone for continuous withdrawal of treated feed liquor therefrom, a permeate collection chamber for each such support discharge electrode, each such chamber being equipped with adjustable throttling outlet means for controlling back pressure therein, and means for continuously removing resulting fluent electrodeposit from collection on the deposition electrode at a rate effective for maintaining substantially unattenuated electric current flow between said electrodes at an operating voltage above $V_1$, said means for removing comprising a deposition electrode adapted for through-the-pore flushing away of or surface flushing away of said fluent electrodeposit. Feed liquor is passed into the cell zone; operating voltage across the opposed electrodes is maintained above $V_1$; fluent electrodeposit tending to collect at the deposition electrode is removed therefrom at a rate effective for maintaining substantially unattenuated electric current flow between opposed electrodes at the elevated voltage by: (a) flushing it away from the deposition electrode surface into the cell zone while liquid enriched in dissolved electrolyte is forced out of the cell zone through a product discharge electrode; (b) flushing it through a product discharge electrode as a cell liquor-bearing permeate; or (c) flushing it through a product discharge electrode as in (b) while liquid enriched in dissolved electrolyte is forced out as in (a); and permeate that flows through the microporous product discharge electrode or electrodes is collected, the differential pressure across such product discharge electrode or electrodes being regulated for obtaining permeate enriched in the liquor components attracted to a particular product discharge electrode. Suitable feed liquors include aqueous electrocoating paints and waste waters therefrom, pigmented dispersions, and generally aqueous streams and wastes containing fats, oils, sliming and gel-forming materials, e.g., sewage, food processing, paper making, industrial plant, petroleum refinery, and mine wastes.

The patent application is a continuation-in-part of my copending U.S. patent applications Ser. Nos. 76,311 of Sept. 28, 1970 now abandoned, Ser. No. 91,905 of Nov. 23, 1970 now abandoned, and Ser. No. 94,267 of Dec. 2, 1970 now abandoned. This application is related also to my copending patent application Ser. No. 99,120 of Dec. 17, 1970. The teachings of these applications are incorporated herein by reference.

This invention relates to improvements in electrical pressure cell apparatus and process for treating a feed liquor which contains dissolved electrolyte and provides at operating voltage a fluent electrodeposit having electrical conductivity lower than said feed liquor on one of the electrodes as a deposition electrode.

The prior proposal most pertinent to this invention is the one shown in U.S. Pat. 1,603,298 to separate water solutions of mixed metalliferous electrolytes using a pair of opposed porous electrodes at a voltage too low to cause the metals to electroplate on the electrodes. The ensuing electrically-stressed percolation is stated to yield fairly pure materials in a cascading arrangement of the permeate flows. The cell outlets are from the permeate collection chambers only, and there is no contemplation of or provisions for handling electrical-resisting material such as a resin or a gel or an oil having the propensity to build up electrical resistance on an electrode. The useful voltage necessarily is extremely restricted.

In another proposal (U.S. Pat. 2,905,604) black liquor from sulfate pulping of wood is treated in an electrolytic cell to coat out lignin on an anode surface and scrape it away therefrom. Broadly related to this is U.S. Pat. 2,919,235 which shows the collection of electrolytically-produced insoluble hydroxide on an electrode surface which is cleansed ultrasonically. The art of electrolytically producing caustic soda and chlorine from sodium chloride is replete with the use of perforated electrodes, as generally is the art of electrolyte purification, e.g., acetic acid solutions, and the like.

Other more remotely pertinent apparatus and processes for electric filtration and electrodecantation also have been proposed heretofore. U.S. Pat. 2,640,026 shows feeding of contaminated liquids such as water into a zone bounded by an inner metallic filter screen electrode, whence the liquid passes through that electrode into an annular zone between that screen electrode and an outer metallic filter screen electrode, having opposite charge, the two being maintained in an insulating casing, the operation being to induce sedementation from the water in process. The patent shows a way to introduce the liquid so as to electrically insulate the apparatus from feed and drain connections.

U.S. Pat. 1,231,967 shows pressure cell process and apparatus for electrolytic recovery of metals from their solutions whereby a series of electrode pairs are arranged in the manner of a plate-and-frame filter press with the feed liquor being passed into the cell zones to obtain precipitation of a filter cake on porous cathodes suitably covered with a filter cloth. Periodically the filter cake is sluiced or otherwise removed from the cathode covers.

U.S. Pat. 2,116,509 shows an electric dehydrater for inducing flocculation of foreign materials such as emulsified oil particles to induce their coalescence or sedementation wherein a charged aqueous emulsion is passed through a first non-conducting filter juxtaposed to a charged electrode screen, thence into a sedementation zone with water leaving that zone through another oppositely-charged electrode screen juxtaposed against a second non-conducting filter to yield clarified water. The operation appears broadly analogous to that of U.S. Pat. 2,640,026 and is representative of a variety of electrostatic precipitations, also old in the art. In such apparatus, the filter beds can tend to clog with film-forming material as they are not current-carrying, heat-conductive members, even though porous.

A further and even more remote electrical cell arrangement for dewatering a filter cake is proposed in U.S. Pat. 1,435,886 whereby filter cake on a porous drum cathode is stressed with an anode slipper or the like to dewater it. While not a pressure cell, dewatering of the cake such as cornstarch is done apparently electroendosmotically and the cake is scraped off the drum similarly to that on a conventional continuous rotary vacuum filter.

U.S. Pat. 1,357,401 relating to a chlor-alkali cell, and U.S. Pat. 805,969, relating to a metals separation cell, show coarsely porous diaphragms around a cathode electrode which reduces velocity and turbulence of liquor at the surfaces of such electrode.

In the art of electrocoating of paint, with the paint attracted to an anodic substrate, removal of excess or offending ions from the paint bath has been proposed by means of dialysis, ion exchange, and various species of electrodialysis such as those using rigid or deformable membranes and ionic membranes. Principal patents in this field include my U.S. Pats. 3,230,162 of Jan. 18, 1966, and 3,304,250 of Feb. 14, 1967, wherein pH of electrocoating bath is shown to be maintained by electrodialysis while an electrode substrate is being coated. Also illustrative are U.S. Pats. 3,419,388; U.S. 3,496,083; and Japanese patent publication No. 13,231/1970 of May 13, 1970. Electrocoating paints also can be made to be attracted to a cathodic substrate as, for example, those paints shown in U.S. Pat. 3,455,806 and others representative of this aspect of the electrocoating art.

To treat electrocoating paint baths or waste waters therefrom, e.g., rinse water, for reuse or disposal, it has been proposed to use ultrafiltration and reverse osmosis devices and techniques for alleviating waste disposal problems (e.g., U.S. Pats. 3,528,901 and 3,556,970). These both can be effective, but have been costly because the equipment used is essentially of low capacity per unit of invested capital.

The instant invention provides a practical way for electrolytic treatment of electrically-conductive liquor containing dissolved electrolyte and providing at the comparatively high operating voltages useful herein a fluent electrodeposit which, if allowed to accumulate on the deposition electrode, builds up the electrical resistance thereof relative to said liquor in process. It provides a means for depleting soluble electrolyte and/or the fluent electrodepositing material from the liquor, and practical separations, depletions, and enrichments can be obtained at attractively high rates. Units can be cascaded as to one or more of the effluents, or these effluents can be treated further in conventional manner, e.g., ion exchange, distillation such as vacuum distillation, conventional or even selective filtration, ultrafiltration, reverse osmosis, electrodialysis, neutralization, or the like.

One aspect of this invention is an improvement in process for treating electrically-conductive liquor in a pressure cell zone having opposed electrodes externally powered with current passing through liquor therebetween wherein at least one of said electrodes is a microporous product discharge electrode that is readily permeable to said liquor, forms a boundary area of said cell zone, and communicates by its permeability with a permeate collection zone. The improvement comprises feeding said cell zone with a feed liquor which contains dissolved electrolyte and provides a fluent electrodeposit on one of said electrodes as a deposition electrode at a minimum voltage $V_1$ across said electrodes, said electrodeposit having electrical conductivity lower than said feed liquor; applying voltage across said electrodes in excess of $V_1$, whereby said electrodeposit tends to form; continuously removing the resulting electrodeposit from said deposition electrode at a rate effective for maintaining substantially unattenuated electric current flow between said electrodes at a voltage thereacross in excess of $V_1$; and collecting the permeate that flows through said microporous product discharge electrode or electrodes into the permeate collection zone communicating therewith.

Another aspect of this invention is an improvement in pressure cell apparatus for treatment of such feed liquor. The apparatus has opposed first and second electrode means retained in a casing and disposed apart from each other for forming an electrical cell zone therebetween when brought into an electrical circuit with each other through connection in said cell zone by a body of the electrically-conductive liquor. At least one of said electrode means is a microporous product discharge electrode that is readily permeable to said liquor, forms a boundary area of said cell zone, and communicates by its porosity with a permeate collection chamber having a drawoff outlet. At least one of said electrode means is a deposition electrode for attraction of the fluent electrodeposit. Said apparatus includes also an inlet to said cell zone for continuous supply of the feed liquor thereto; an outlet from said cell zone for continuous removal of treated feed liquor therefrom; a throttle valve (manual or automatic) for regulating back pressure in each permeate chamber; and means for effecting through-the-pore flushing away of or surface flushing away of resulting fluent electrodeposit from said deposition electrode at a rate effective for maintaining substantially unattenuated electric current flow between the electrode means at an operating voltage in excess of $V_1$.

For a given feed liquor, voltage $V_1$ can be found by suspending two vertical, opposed solid plate A.I.S.I. type 316 austenitic stainless steel electrodes 2.5 cm. apart from each other in a body of such liquor at proposed cell operating temperature (generally 26.67–60° C.) under quiescent conditions. D.C. voltage between the electrodes gradually is raised from zero and that and amperage flow is metered. When the amperage breaks downward, $V_1$ is read; generally it will be between about 3 and 12 volts.

As this invention is practiced at voltage above $V_1$, an electrodeposit (oil film, resinous film, slime or gel) is tending to form at all times. Whether this film is thought of as being precluded from forming substantially, removed or resolubilized or redispersed at least about as fast as it is formed, or whatever the mechanism, the net effect is removal of the film adequately for establishing and maintaining appreciable amperage for electrodeposition at an operating voltage above $V_1$ which imparts separating efficiency to the operation.

Figure 1:
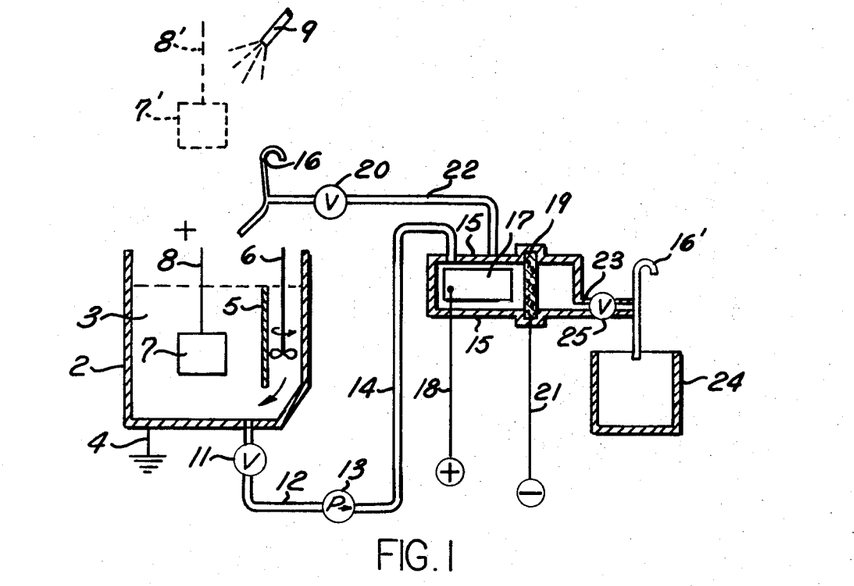

FIG. 1 of the drawings shows a flow diagram for conventional anodic electrocoating of metal parts with concentration of the bath periodically by means of the instant invention. Electric current supply apparatus and instrumentation are not shown as these are conventional. Bath tank 2 is filled to the liquid level indicated with conventional anodic electrocoating paint dispersion (containing 10% solids NVM) such as that described in Example 1 of U.S. Pat. 3,230,162 (i.e., resin based on maleinized linseed oil and ionized with amines). Nonvolatile matter (NVM) of a painting mixture is reckoned in this patent application as the residue on curing a sample of paint at 177° for 20 minutes. Solids or oil content of other feed liquors can be found conventionally. Metal tank 2 functions as a cathode with respect to item 7 and is grounded by connection 4. In tank 2 there is a weir baffle 5, and aqueous paint dispersion is pumped over the baffle, down through the right side and under the weir baffle bottom by agitator 6, which keeps solids in suspension and helps to remove froth and bubbles from the surface of the bath.

Metal plate anode 7 is dipped automatically into the bath from positively-charged anode hanger 8 by means not shown. The potential between anode and cathode is 50–300 volts and the total time of immersion is 30 seconds to 5 minutes, including dipping and withdrawal. The anode is removed automatically from the bath by means not shown, the current is turned off; the anode then assumes the positions shown in dotted lines as item 7' suspended on hanger 8'. The anode is there rinsed with water to perfect the surface, and the rinse drainage is permitted to fall into bath tank 2. Thereafter, the anode is removed to an oven and baked to cure the paint film. In some instances the rinsing can be staged in a plurality of stages, the last being with deionized water, the earlier one or ones being with used, collected rinse until eventually disposed into bath tank 2.

After a number of anodes have been so dipped and rinsed, the bath will require some concentration because of the added aqueous rinse. Additionally the bath can be made up in depleted ingredients, suitably with an amine-deficient paint concentrate feed, but suitably if desired with other conventional feed with at least adequate amine for quick, easy dispersion of ingredients into the bath. Valve 11 is opened, and bath liquor flows through line 12 through pump 13 and line 14 into insulating plastic case 15 of the electrolytic pressure cell apparatus. This unit is equipped with vents 16 and 16', anode 17 charged by electrical lead 18 to be anodic with respect to porous 316 stainless steel cathode plate (item 19) 3.18 mm. thick ("E" grade, Pall-Trinity Micro Corporation) charged negatively by electrical lead 21, cell chamber outlet 22 returning through valve 20 to bath tank 2, and filtrate drain 23 and valve 25 draining into storage tank 24. Direct current voltage (rectified A.C. with about 5% ripple factor) is used in both the electrocoating operation and the bath concentration operation. Valve 20 can be throttled to put back pressure on pump 13; valve 25 can be throttled to restrict flow through cathode 19 and maintain about 12–65 cm. of water pressure differential across plate 19.

The flow rate within the horizontal cylindrical cell chamber 15 based on liquor fed through line 14 is about 10.5 liters per minute per square meter of circular cross sectional area of the chamber, thereby providing a high turbulence over the anode. The anode and cathode are disposed to vent gases readily, purge them away with outlet flows, and preclude any substantial formation of trapped gas (e.g., electrolytically-produced hydrogen and oxygen at the cathode and anode, respectively) which thus is continuously swept and vented from the system.

The voltage between anode and cathode in the cell chamber is maintained at 7.5 volts, whereby no noticeable anodic electrodeposition of insulating paint or paint binder takes place. Such deposition generally is abruptly evident on an ammeter measuring cell chamber current; a minute film ordinarily inhibits current flow drastically. Under quiescent cell conditions electrodeposition of the paint at about 26.67° takes place at about 5 volts. The filtrate drainage from line 23 into tank 24 proceeds. The solids (NVM) in said filtrate are substantially less than in the circulating paint bath liquor. When the bath is sufficiently concentrated, the cell operation is ceased and valve 11 closed. The filtrate in tank 24 can be reprocessed in the same or a similar concentration cell apparatus if desired to further remove additional paint solids, and the resulting refiltrate, or the original filtrate, or a mixture of the same can be returned if desired for rinsing through outlet 9. If a filtrate is too low in electrolyte to process well, amine or ammonia can be added if desired. If additional turbulence is desired in the cell chamber, anode 17 can be rotated or vibrated by conventional means not shown. Instead of periodic concentration, the bath can be concentrated continuously in analogous manner.

Figure 2:
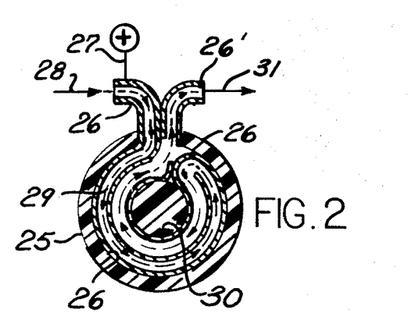

FIG. 2 is a cross-sectional view of a cylindrical cell chamber with a special anode inserted therein. Case 25 is made of clear acrylic plastic. The anode inserted is a metal channel, item 26 of convoluted configuration, exerting slight spring pressure against the inside wall of case 25, and it is charged anodically by positive electrical lead 27. Liquid 28 is admitted into the left-hand side of the anode top, follows path 29 indicated by the dotted line, and goes out outlet 26' on the right-hand side of the anode top as flow 31. Gases collecting in the cell chamber are swept out with flow 31, and when necessary are separated from circulating liquor in a pump suction reservoir. The balance of the cell apparatus including porous cathode, etc. is not shown, but such anode can be used in case 15 of FIG. 1, if desired. Core 30 of the chamber can be solid plastic around which such channel anode is fitted to eliminate low-velocity space, or simply left out. While turbulence is provided ordinarily by an external pump, pumps or agitators inside the cell chamber or rotating or vibrating anode electrodes can be used.

Figure 3:
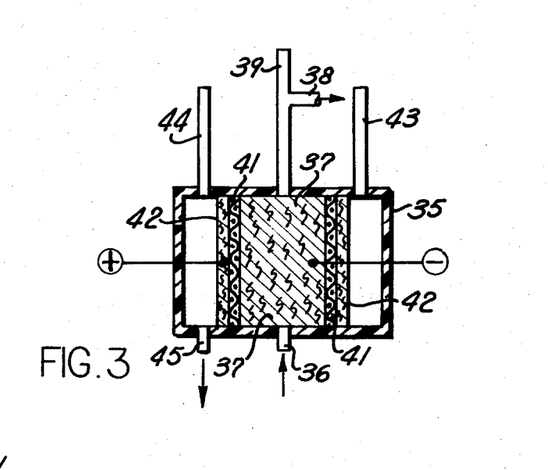

FIG. 3 shows a packed deposition electrode with a flow of liquor therethrough. While the previous figures have been described with respect to concentrating an anodic electrocoating piant, FIG. 3 is described in connection with an electrically-conductive liquor which contains ionized resin electrodepositable onto a cathode such as the painting bath shown in Example 1 of U.S. Pat. 3,455,806 (copolymer resin with tertiary amino functionality ionized by acetic acid).

Insulating plastic case 35 has a bottom inlet for liquor 36. The liquor passes at high velocity through packed cathode 37, e.g., metal turnings or metal Raschig rings which optionally can be fitted with helical or other baffles for further increasing liquor flow velocity past the deposition cathode surface. The liquor flows out of packed cathode chamber 37 and is withdrawn through pipe 38. Pipe 39 is a vent. The view is a cross-sectional elevation. Lines 36, 38, 39, 43, 44 and 45 can be throttled with valves, not shown, to regulate pressures and permeate flows.

Surrounding the packed cathode in annular fashion is a 16 mesh per cm. polypropylene screen 41, which acts to support the cathode packing, is electrically and chemically inert to the system, and acts as a zone to reduce turbulence at the porous anode face. Surrounding such screen, in this instance adjacent to it, but also permissible to be spaced away from it, is item 42 an annular porous metal anode, 3.18 mm. thick, a "G" grade (Pall-Trinity Micro Corporation) austenitic stainless steel filter plate. Close spacing (e.g., 1.6 mm. to 50 mm.) of electrodes is desirable to minimize IR drop through the cell chamber. Filtrate (or "permeate") from the outer periphery of anode 42 collects in the surrounding case and is drained through outlet 45. Outlets 43 and 44 are vents.

Figure 4:
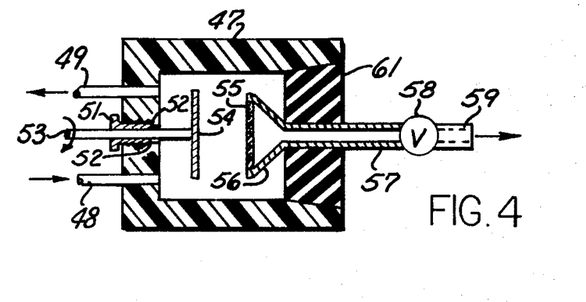

FIG. 4 is a cross-sectional view of a cylindrical cell chamber with a rotating anode to operate analogously to the pressure cell of FIG. 1 on anodic electrocoating paint. Cell chamber 47 is of non-conducting plastic having stoppered end 61 on the right-hand. Feed liquor is pumped into the cell chamber through inlet 48 by a pump not shown, circulated through the interior of the chamber, and withdrawn through outlet 49 into a pump feed reservoir not shown. Rotating anode 54 is driven by shaft 53 which projects from the left-hand side of the cell through a stuffing box fitted into the chamber with packing ring 52 and compressor nut 51. The shaft 53 is driven by a variable speed motor not shown, and D.C. power (rectified A.C. with about 5% ripple factor) is applied to anode 54 by brushes (not shown) contacting shaft 53 external to casing 47. Anode 54 is a 5.4 cm. diameter vertical, clean stainless steel disc.

The porous cathode in this instance is item 55, an A.I.S.I. 316 stainless steel plate, 3.18 mm. thick, obtained from the Pall-Trinity Micro Corporation. It is fitted into metal funnel holder 56, which necks down to and projects through end of a 6.4 mm. tubing 57. Cathode filtrate passes through this tubing, valve 58 and thence through outlet 59. Valve 58 is used to vary the differential pressure across cathode porous plate 55.

The operation is smoothest at anode rotation of 2500–3000 r.p.m. The superficial cathode area exposed in the cell zone is 25.6 square cm. The operation of this cell is described more fully in Example 4.

In place of a rotating deposition electrode, one can use another rapidly moving one to flush off incipient electrodeposits. Thus, the deposition electrode can vibrate or oscillate rapidly. Alternatively, also, the deposition electrode can be made as a porous inlet for cell feed liquor, e.g., a porous tube capped at the end, to flush away incipient electrodeposits thereon. Pulses within the cell, e.g., generated by ultrasonic apparatus, also conceivably can be used to cleanse the deposition electrode.

Figure 5:
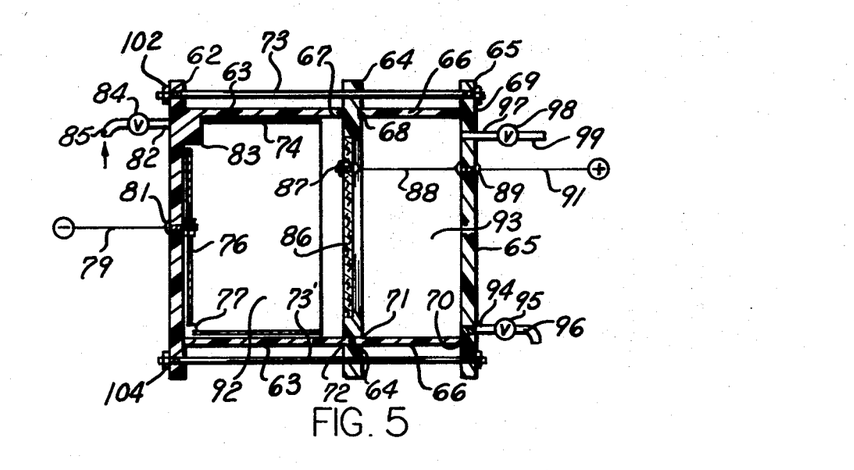

FIG. 5 of the drawings is a cross-sectional elevation of apparatus I have used for extracting from conventional anodic electrocoating rinse water a paint binder concentrate. Other electrodepositable paint components such as extender resins, solvents, and pigmentary solids are extracted with such paint binder concentrate when they are present. Item 62 is an octagonal flange member cut out of a 12.7 cm. square by 12.7 mm. thick clear polymethylmethacrylate sheet. Cemented to this is item 63, a 10.15 cm. O.D. by 4.75 mm. wall thickness cylinder of the same plastic. At the upper portion where cylinder 63 and 62 join, there is cemented a small reinforcing block of the same plastic for inlet and outlet connections, discussed in more detail in connection wtih FIG. 6.

The right-hand end of cylinder 63 is filleted onto 12.7 mm. thick octagonal flange 64, made of the same plastic. Flange 64 is counterbored in the center to permit the insetting of anode plate 86, 7.6 cm. in diameter, 3.18 mm. thick, "C" porosity 316 stainless steel Pall-Trinity Micro Corporation filter plate. The plate is set into and cemented into the shoulder in flange 64. The hole through flange 64 leaves a 6.35 cm. diameter open, circular area exposed at the back of the plate.

Flange 65, 12.7 mm. thick of the same plastic, forms the right-hand side of the apparatus. Filleted into it, and into flange 64 also, is the cylinder 66, this cylinder being of the same kind of plastic in the same thickness and diameter as cylinder 63. Filleted ends 67, 68, 69, 70, 71 and 72 each have sealing ring gaskets. The whole casing assembly is held together with four thrubolts which are illustrated in FIG. 5 as items 73 and 73', and the assembly can be taken apart for cleaning and rearrangement.

The cell itself is the 3.5 cm. long cavity 92 bounded by flange 62, cylinder 63, flange 64 and anode 86. The cathode of the cell is in two parts, namely cylinder 74 of 20 gauge (0.95 mm.) stainless steel adjacent to the walls of cylinder 63 and projecting to within about 9.5 mm. of the anode plate, and disc 76, of the same kind of stainless steel pressed against flange 62. The two parts are electrically connected by wire 77. Direct current supply to the cathode comes through electrical lead 79 and binding post 81 which seals against leakage. Liquor feed to the cell is pumped in through tubing 85, valve 84 and connector 82, which is screwed into flange 62 to discharge therethrough and through the reinforcing block having inlet port 83. The liquor inlet is directed to give a liquor swirling motion in cell 92. Liquor outlet passes through an opposite port, not shown, in the reinforcing block and discharge tubing screwed into flange 62. These outlet means are not shown in this figure, but rather in FIG. 6.

Binding post 87 connects D.C. electrical lead 88 to anode 86. This lead crosses anode discharge zone 93 and is connected to sealed binding post 89 passing through flange 65. Binding post 89 is connected to an outside D.C. power zone as an anode by means of electrical lead 91. The anode discharge zone is drained through outlet 94, valve 95 and tubing 96. A small bleed outlet 97 from the top of anode discharge zone leads out through valve 98 and tubing 99 to maintain a water-rich liquid passage through the porous anode at an increased flow rate, thus assisting in controlling temperature, if desired. The anode discharge zone is 3.18 cm. long.

In operation liquor is pumped continuously (by pump not shown) through inlet 85, throttled if desired with valve 84, and into the cell through inlet port 83. The cell contents are discharged through an outlet port (not shown) looking opposite to inlet port 83 and connected to an outlet line not shown. Such outlet line directs flow to a tank (not shown) which acts as a reservoir feed to the suction of the pump. Pressure in the cell forces deposited fluent electrocoating paint binder concentrate through anode 86 into anode discharge zone 93 and out outlet 94, valve 95, and drain 96 into a collecting tank. Valve 95 can be throttled to change the pressure differential across plate 86. Waste heat from the operation can be taken away from the anode by opening valve 98 and bleeding off a small stream of aqueous-rich liquid from the top of anode discharge zone 93 and back into the reservoir tank for such liquor. This permits a higher cooling liquid flow through at least part of the anode, and removes heat therefrom for control of temperature. Cylinders 66 is reinforced when necessary by banding it with stainless steel strapping (not shown) about the outside.

Figure 6:
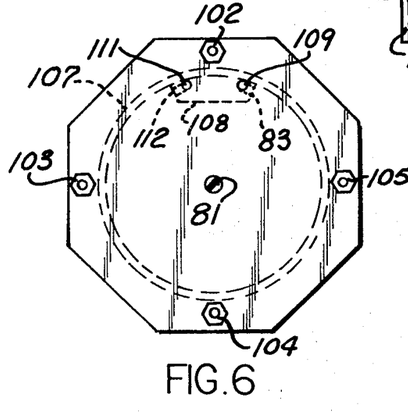

FIG. 6 shows the end of plastic flange 62 of FIG. 5 having thrubolt holes 102, 103, 104, and 105. Cemented to the opposite side of the flange, to be concentric with the flange, is plastic cylinder 63, the annulus of which is indicated in FIG. 6 as item 107. Cathode binding post 81 is at the center. At the top of the joint made by cylinder 63 and flange 62, on the side away from the viewer, is the cemented-in reinforcing block of clear polymethylmethacrylate, 108, having inlet hole 109 for conducting liquor to and through inlet discharge port 83, and outlet hole 111 collecting from outlet discharge port 112. Holes 109 and 111 are bored and threaded to receive threaded inlet and outlet connections, as are inlets 97 and 94 of FIG. 5. Optionally flange 62 can have also a connection (not shown) into cylinder 63 for measuring pressure and/or temperature of the cell.

While this operation can be done, for example at about room temperature or even below, it is preferable to maintain the temperature of the anode substantially above room temperature for reducing viscosity and electrical resistivity of the electrodeposited paint to minimize plugging of the anode. Ordinarily electrocoating paints are very sensitive in these respects to rise in temperature. Thus, the temperature of anode 86 can be maintained as high as about 54–66° but not so high that the deposit excessively floats off or sloughs off the anode or undergoes detrimental chemical change.

One way to get the temperature of the deposition electrode up is to make it ¼ to ⅒ the size, or even less, of the superficial area of the opposite electrode. This, of course, decreases its flow capacity. Alternatively and preferably the circulating liquor is heated to desired temperature and even external heat can be applied to the deposition electrode. Pressure used desirably is high enough to prevent liquor from boiling in the cell with attendant untidiness.

The pressure used in the operation for the forcing must be at least slightly positive on the cell side (deposition side) of the deposition electrode with respect to the other side of said electrode. Usually a few cm. Hg differential across the porous electrode is adequate and supplied by pump or gravity head from elevated storage, etc., but much more pressure can be used, e.g., 100, 150 cm. Hg or even more, where the equipment can tolerate such pressure. Advantageously for safety most, if not all, of the structural parts of the apparatus, except the electrodes, can be made of non-conducting (electrically insulating) materials such as glass, porcelain, and plastic.

Figure 7:
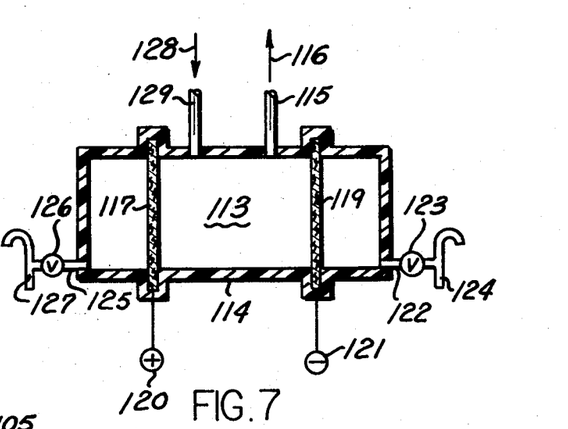

FIG. 7 is a cross-sectional view of a cylindrical cell casing with the cathode being pervious to an electrodepositable cathodic paint and the anode being pervious to the anolyte ionizer therefor. The electrically-conductive liquor in this case is wash water from rinsing parts conventionally painted with ionized resin that was electrodeposited onto the cathodically-charged parts, such as in a painting bath shown in Example 1 of U.S. Pat. 3,455,806 (copolymer resin with tertiary amino functionality ionized by acetic acid). The wash water has about 1.5% solids (NVM) by weight.

Wash water 128 enters cell inlet 129 from a reservoir and pump system not shown, and is discharged from cell 113 through outlet 115 as treated liquor 116. The casing is item 114, made of clear polymethylmethacrylate plastic. Anode 117 is an "H" grade Pall-Trinity 316 stainless steel porous plate. In this instance the deposition electrode is cathode 119, a "D" grade Pall-Trinity 316 stainless steel porous plate. Both are 3.18 mm. thick. Close spacing, e.g., 2.5 cm. to 5 cm., of electrodes is desirable to minimize IR drop through the cell chamber, but as electrodeposition can take place very thickly and very fast at elevated temperature, such spacing must be made to accommodate this for smoothness of operation. Temperature in the cathode are is maintained at about 60°. Aqueous acetic acid anolyte filtrate or "permeate" from anode 117 drains from the cell through outlet 125, valve 126, and vented line 127. Pressure in the cell, e.g., 52 cm. Hg or less, forces this premeation. Valve 126 can be utilized to put back pressure on the cell. A resin-rich electrodeposit mixed with cell liquor is forced through cathode 119 and flows through outlet 122, valve 123, and vented line 124. Valve 123 also can be used to adjust back pressure in the cell. Items 120 and 121 are D.C. leads to the electrodes.

Figures 8, 9:
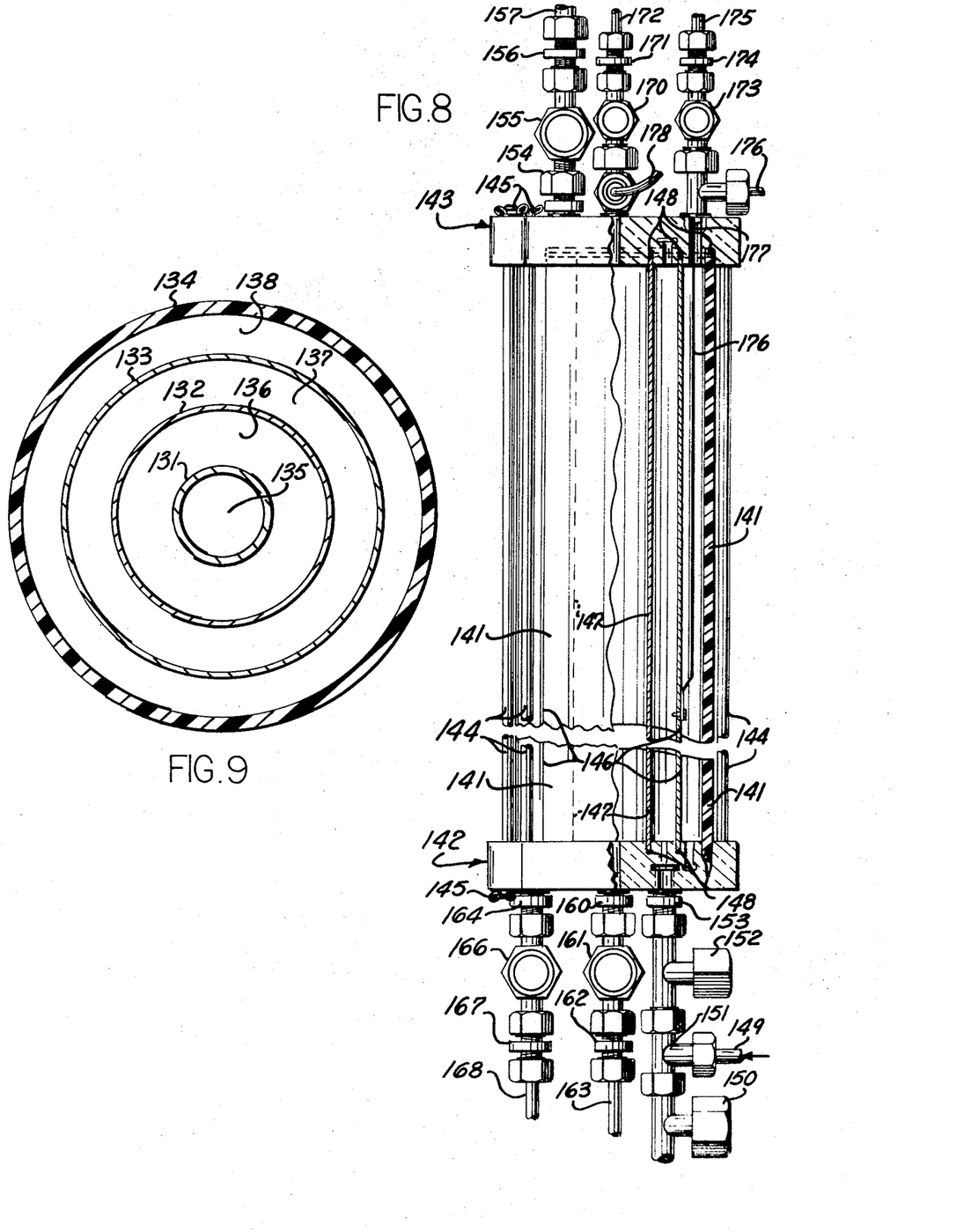

FIG. 8 shows in vertical half section the pressure cell of a portable unit known as an ELECTROPURGE unit, a trademark of SCM Corporation. This cell unit is mounted on a portable cart having a 30 ampere–40 volt (switchable to 60 ampere–20 volt) power supply with silicon diodes rectifying 115 volt single phase input current from an external source. The power supply has isolation transformers, an ammeter, a voltmeter, a case, and a cover. Mounted above the power supply on the cart is an 11.3 liter plastic tank for holding feed liquor. Taking suction from the base of the tank is a centrifugal pump having a foot valve and strainer combination that keeps the pump primed and protects it from gross trash particles. The pump discharges through a cartridge water filter (none of the foregoing shown) into line 149 and T 151 of the pressure cell unit. Valve 150 normally is closed and serves as a drain.

The cell unit is encased in a 10.15 cm. diameter by 4.75 mm. thick, clear polymethylmethacrylate tube 141 having bottom flange 142 and top flange 143. Both flanges are corner-chamfered, 12.7 cm. squares, 2.54 cm. thick. The cell unit is held together by four thrubolts having wing nuts at each end (schematically shown as bolt item 144 and wing nut items 145 in the drawing). The outer plastic tube is filleted into the ends and sealed with a pair of O-ring gaskets at each end. Concentrically mounted in the case and filleted into the ends thereof are a pair of porous electrode tubes, each also sealed at its ends with an O-ring gasket, all the gaskets being indicated collectively as items 148. Inner electrode 147 is a 3.7 cm. O.D. by 45.7 cm. long, 1.5 mm. thick porous, austenitic stainless steel tube having "G" porosity. Outer electrode 146 is the same thickness and length, and is a porous, austenitic stainless steel tube having 7 cm. O.D. Insulated electrode lead wire 176 from the power supply enters through a packed joint and down through a vent hole 177 and is attached to outer annular electrode 146 by a screw connector. Insulated electrical lead wire 178 similarly enters through a packed joint and a vent hole (not shown) for screw connection (not shown) to inner annular electrode 147. Central to the top of the unit is a vent line having throttle valve 170, union connector 171, and tubing 172. The annular area between the outer electrode and the case is vented by a feed line having throttle valve 173, union connector 174, and tubing 175.

Feed liquor pumped into line 149, into T 151, passes through throttle valve 152 and connector 153, then into the base of the cell unit between the two porous electrodes. Treated feed liquor emerges from the unit through connector 154 mounted so as to accept flow from the top of the annular space between the electrodes, throttle valve 155, union connector 156, and tubing 157, which empties back into the feed storage tank.

When the inner porous electrode is connected as a cathode, catholyte permeate drains from the bottom center of the unit through connector 160, throttle valve 161, union connector 162, and tubing 163 into a receptacle (not shown) therefor. At the same time, anolyte drains from the base of the outer annulus through connector 164, throttle valve 166, connector 167, and tubing 168 to a receptacle, not shown. Throttle valves 161, 166, 155, 152, 170 and 173 are used to control pressure in the unit and differential pressure across the porous electrodes.

FIG. 9 shows a cross-section of a separating device for multiple separation practice on an anolyte such as a dilute mixture of cathodically-depositing electrocoating paint described in connection with FIG. 3. Item 131 is a porous, tubular cathode made of sintered stainless steel powder having absolute porosity of 25–50. Surrounding it in annular arrangement is a similar porous electrode 132, an outermost similar porous electrode 133, and case 134. This arrangement is fitted into end plates with appropriate inlets and outlets for fluids. Electrode 131 is grounded, electrode 132 is charged with direct current at +50 volts, and electrodes 133 at +100 volts. The feed liquor is injected into annular space 136, and treated liquor is withdrawn from the other end of that space.

Catholyte from the feed permeates through electrode 131 and into space 135 where it is withdrawn by means not shown. Anolyte permeates through electrode 132 into annular space 137. Part of it can be withdrawn from that space if desired. A further anolyte, because electrode 133 is anodic with respect to electrode 132, permeates through electrode 133 into annular space 138, thus providing a concentrating effect on this anolyte.

In place of electrode 133, one can use instead a dialysis membrane or a membrane suitable for ultrafiltration or reverse osmosis, suitably reinforced. When the pressure in annular space 137 is sufficiently high, the permeate then, going through such semi-permeable membrane into annular space 138, contains only small molecules and ionic substances; larger molecules are restrained from coming therethrough.

In most instances the operation of the electrolytic cell apparatus for concentration, filtration, depletion, etc. of aqueous liquors will be done at about room (ambient) temperature or up to about 15° or more above. Lower temperatures can be used if desirable or necessary, providing that the feed and other liquors are in fluent condition. Ordinarily such liquor is aqueous, but other electrically-conductive liquor media susceptible to autoionization such as glacial acetic acid, acetic anhydride, HCN, hydrazine, hydroxylamine, $SO_2$, HF, $H_2SO_4$, $COCl_2$, acetonitrile, a nitromethane, liquid ammonia, and tetrahydrofuran are contemplated broadly also in the liquid phase where their oxidative or other dangerous properties can be controlled safely. If the temperature of the aqueous pressure cell is substantially above about 49°, odors and other undesirable emissions or degradations of material in process often can result. However, where such and even higher temperatures can be tolerated, up to that approaching the boiling point of the liquor in process under the prevailing pressure conditions (generally about atmospheric pressure, but higher if necessary or desired), one can use such higher temperature advantageously to maintain the deposition electrode hot enough to melt deposits off rapidly, resolubilize or otherwise substantially preclude incipient electrically-insulating deposits on such electrode surface. (Generally, the electrical resistance of electrocoating resin films drops rapidly with increasing temperature and the inclusion of organic solvents). Thus, this can permit in some cases the use of higher voltages, even coarser porosity of electrodes, and/or substantially elevated pressures while obtaining quite desirable and effective separations. In the treatment of fouled, inorganic-rich industrial plant and mine wastes, sewages, black liquor from sulfate pulping, aqueous terpene hydrocarbon dispersions such as citrus limonene or turpentine dispersions, slimes and gel-formers, this can be of some advantage for increased output of filtrate from the cell.

Thus, if an electrically-resistive fouling material tends to melt fairly readily at 60°, e.g., a film-forming resin, proteinaceous film, or gel in aqueous dispersion, the deposition electrode can be operated statically or in motion at about 65–70° by heating either the liquor fed to the cell, the liquor in the cell, or the deposition electrode itself. Some waste electric heat is developed in the process. This can be intensified at the deposition electrode by reducing the size of the deposition electrode relative to the opposed electrode (although it should be recognized that this is generally undesirable when conditions of slight deposition are approached as when operating with a solid deposition electrode at about room temperature and about maximum voltage for a particular liquor and cell agitation conditions). Control of differential pressure across a porous electrode is important to achieve separation without overwhelming the electrode while achieving desired electrode cooling and adequate resolution of permeates relative to the liquor being treated.

Absolute permeability of the porous electrode for this invention is defined in and can be tested in accordance with the procedure shown in proposed SAE Aeronautical Information Report (AIR–887), Mr. Robert I. Gross, 1965, Aircraft Porous Media, Inc., Glen Cove, N.Y., designated as APM–FSR–26.

Such electrode advantageously is made of metal, e.g., A.I.S.I. 300 and 400 series stainless steels, Monel, nickel, Inconel, or the like and is best substantially inert to all components of the liquor. Alternatively, it can be built of electrically-conductive carbon such as graphite, or of metal coated ceramic or plastic or the like, or even a stack of several very fine electrically-conductive screens or sieves, or powdered metal pressed and sintered onto a screen. Such electrode need not be self-supporting, but can be enclosed in a coarsely foraminous case if desired. If the absolute porosity of such electrode for water at room temperature is substantially less than about 800 millimicrons, the plates are more difficult to produce and the flow rate therethrough can drop off a great deal. The minimum porosity, however, can be made much finer, as by rolling a coarser plate, but plugging is more apt to occur and the expense can be much greater to make and use. Such porosity should, of course, be adequate to pass the dissolved electrolyte in any case. Advantageously, such porosity is at least about 1–5 microns, and preferably at least about 12. On the other hand, if the absolute porosity is substantially greater than about 100–160 microns, the cell can be comparatively ineffective for its separating purpose at ordinarily useful voltages and pressure differentials. Of course, it is possible to place an electrically-non-conducting sieve or other foraminous material ahead of the high pressure side of the porous electrode, e.g., a cloth, sieve, or screen, to secure a prefiltering and turbulence-suppressing effect if desired. The preferred porous electrodes here are porous austenitic stainless steel plates because of their effectiveness and resistance to attack. Ordinarily many of these are scaled alphabetically, typically as follows by the Pall-Trinity Micro Corporation, Cortland, N.Y., U.S.A.:

| | C | D | E | F | G | H |
|---|---|---|---|---|---|---|
| Mean pore size, microns | 165 | 65 | 35 | 20 | 10 | 5 |
| Absolute porosity for liquids, microns | 160 | 55 | 35 | 25 | 15 | 12 |

Where the porous electrode is to be either a deposition electrode for receiving and flushing through of an electrodeposit, or is porous to remove a permeate enriched in soluble electrolyte (such as acid or a base, e.g., an amine, ammonium hydroxide, alkali metal hydroxide, acetic acid or other ionic material), the thickness of the electrode should be at least about 0.8 mm. and advantageously at least about 1.5 mm. to form a bed that permits adequate electrical field constriction of the comparatively coarse and non-linear passageways therethrough at modest voltage between the opposing electrodes. Preferably such bed thickness is about 3 mm. or even more for such purpose and for structural strength when such electrode is self-supporting. Even thicker electrode bed depths can be used if they have virtually no electrical resistance, e.g., 12 mm. and up. As such electrode conducts heat as well as electric current, it helps to lower viscosity of electrodeposits, but should not be allowed, because of excessive thickness and/or heating (or lack of heat removal), to produce excessive, baked-in plugging.

The selection of suitable porous electrodes for the filtration electrode of the cell to some extent is determined by the kind of liquor being processed, the differential pressure across such electrode, and the desired degree of filtration which is wanted in a single filtering stage relative to volume of output. Thus, I have found that treatment of an electrocoating bath like that of Example 1 of U.S. Pat. 3,230,162, and I can use advantageously an E or F grade porous stainless steel electrode plate for dewatering and removing amino materials, whereas baths like that shown in Example 3 (acrylic resin solution) of said patent appear to me to be presently better processed for such purpose with an electrode plate of G porosity.

The current between anode and cathode of the cell apparatus should be net unidirectional. It can be pulsed or have shaped nodes, but preferably is rectified A.C. with no more than about a 15% ripple factor. Where straight-line D.C. power is available, this, of course, can be used with excellent effect.

The voltage used is generally above that necessary to electrolytically dissociate some of the vehicle of the liquor. In most cases the liquor is aqueous, and such dissociation is above about 1.8 volts, whereby hydrogen is liberated from the cathode and oxygen from the anode. The threshold voltage for electrodeposition of the slime under static or turbulent conditions will vary with the kind of slime, e.g., resin, gel, etc. that is electrodepositable, its temperature, specific resistivity, thickness, and continuity of electrodeposited film. However, by keeping the deposition electrode/liquor interface highly turbulent, I have found that I can reach 15–250 volts potential across the cell with an electrodepositable resin not giving net resin deposition, but which under static cell chamber conditions will otherwise deposit at about 5–12 volts. For efficiency I prefer to operate no lower than about three volts potential across the cell. Alternatively, I can flush the electrodeposit through a porous deposition electrode to maintain the high operating voltage.

By an "electrocoating paint" I mean: a film-forming binder material, generally a resin, but also possibly polymerizable monomers or low molecular weight substance, dispersed in water with the aid of an ionizing agent that ionizes at least a portion of ionizable sites in the structurally ionic material that forms a significant fraction of said binder. Such dispersion can contain optionally substantially non-ionic extender resins, pigment, filler, stain, colorant, organic solvent, plasticizer, heatfusible or practically infusible resin particles, antifoam agents, glass frit, or wetting agents, and other ingredients conventional in anodic and cathodic electrocoating paints. Concentrates of such paints contain 0–70% water and often have no, or very little ionizing agent.

My studies have indicated an unusual phenomenon occurring with treatment of a pigmented electrocoating paint bath using various porosity filter electrodes charged oppositely to the deposition electrode. When operating at various ascending voltages, some resinous binder passes into the filtrate at all the voltages used. However, at the lowest voltage titania and carbon black passed into the filtrate; at slightly higher voltage mainly carbon black so passed; very little clay if any passed even at the lowest voltage; there is, of course, a possibility for particle classification in the operation because of size, density, and/or electrophoresis. However, this separative phenomenon acords one the opportunity for producing filtrates and other effluents with different solids composition by varying the voltage (as well as changing filtration rate and thoroughness of overall solids removal from such filtrate).

In general, for efficiency it often is advantageous to operate with as porous a filtration electrode as will produce an acceptable filtrate at the highest voltage as will avoid electrodeposition of sliming electrical resistance on the deposition electrode sufficient to restrict current flow through the cell (readily detectible by ammeter as discussed elsewhere in this application). Removal of various anolytes such as phosphate and nitrate ions from sewage and catholytes such as copper ions from aqueous wastes and iron from copperas wastes are contemplated in accordance with the instant invention.

The following examples show ways in which this invention can be practiced, but should not be construed as limiting the invention. In this application all parts are parts by weight, all percentages are weight percentages, and all temperatures in degrees centigrade, unless otherwise expressly indicated.

EXAMPLE 1

A pigment grind was made from 91.4 parts of resinous binder referred to below in this example, 15.6 parts of morpholine, 0.9 part of antifoam agent (ditertiary acetylenic glycol with methyl and isopropyl substitution on the tertiary carbon atoms), 375 parts of fine kaolin clay, 40 parts of carbon black, 94 parts of pigmentary $TiO_2$, and 383.1 parts of water. An aqueous electrocoating paint bath dispersion of 10% solids (NVM) was made from 288 parts of the pigment grind, 400 parts of the resinous binder concentrate referred to below in this example, and sufficient water to give the indicated 10% concentration.

The resin in the binder was an extended, coupled glyceride drying oil made by reacting 8,467 parts of alkali-refined linseed oil and 2,025 parts of maleic anhydride (heated together at 232.2° for about 3 hours until an acid value of 80–90 results), then cooling this intermediate to 157.2°, adding 1,789 parts of vinyl toluene containing 48 parts of ditertiary butyl peroxide, and reacting at 218.3° for about one hour. The resulting vinyl toluenated material then was cooled to 157.2° and 5,294 parts of non-heat reactive, thermoplastic, oil-soluble phenolic was added, the temperature raised to 232.2°, and the mixture held for one hour. The phenolic resin was a solid lump resin having softening point of 120–150°, a specific gravity of 1.03–1.05 at 20° and had been stripped to remove excess phenol and lower molecular weight materials. It was a condensation product of about equimolar quantities of paratertiary butyl phenol and formaldehyde.

Four hundred parts of the resulting resinous binder were dispersed with 41 parts of water at 74°. Then nine parts of morpholine were added, the mixture agitated for 45 minutes, then 329.4 more parts of water and 36.6 more parts of morpholine were added, and finally 327 more parts of water were added to give a 35% NVM resinous binder concentrate.

This paint bath dispersion was retained in a sump tank connected by a sump pump circulating into and out of a cell apparatus similar to that described in FIG. 1, except that the anode and cell configuration is essentially that of FIG. 2 without a core, 30. The pump circulated the electrocoating paint from the tank past anode 17 at about 10.2 liters per minute per square meter of circular cross-sectional area of the cylindrical chamber containing the anode, thus creating a highly turbulent condition on the anode surfaces.

Pressure in the cell chamber was about 20.6 cm. Hg and the temperature of the cell was 26.67°. Back pressure on cathode plate 19 was applied by valve 25 to give an approximate pressure differential across plate 19 of slightly less than 5.2 cm. Hg. The effective anode surface in the cell was about six times the cross-sectional area of the cell (31.6 square cm.), which was the superficial area exposed by the porous plate cathode 19 to the cell chamber.

The porous plate cathode was an "F" A.I.S.I. 316 stainless steel plate, 3.18 mm. thick, sealed into plastic case 15 by means of hot melt adhesive. The table below summarizes the results of filtration at various voltages.

TABLE I

| Voltage between anode and cathode | Percent solids (N.V.M.) in cathode filtrate | Approximate flow rate, grams/minute/ sq. centimeter through cathode plate |
| --- | --- | --- |
| 0 | 9.8 | 0.420 |
| 2.8 | 9.1 | 0.183 |
| 5.1 | 5.9 | 0.138 |
| 7.5 | 2.5 | 0.122 |
| 8.8 | 1.8 | 0.107 |

At two volts, the approximate decomposition voltage of water in this system, incipient separation occurred to give a cathode filtrate lower in paint solids than the liquor in process; at this stage the rate of flow through the plate was cut in about half. The vast preponderance of the particles in this electrocoating paint were less than five microns in particle size. The absolute porosity rating for the plate was 35 microns, and the nominal rating was 7. Some resin came through the plate at all voltages. Carbon black came through at 8.8 volts with low titania content; more titania with carbon black came through at about 7 volts; very little clay passed through the electrode at these voltages. Minimum deposition voltage ($V_1$) for this paint is about 5 volts at 26.67°.

In similar runs voltages up to almost 10 were obtained before any substantial current inhibiting deposit was indicated on the anode by pronounced leveling off of an ammeter reading measuring current between anode and cathode.

In further similar runs using an "E" grade 316 stainless steel plate, the solids in the cathode filtrate were only 1–2% at voltages as high as about 16 with approximately double the liquor circulation rate through the cell chamber.

EXAMPLE 2

An electrocoating bath of 10% solids in water was prepared from the resinous mixture, below in this example, and sufficient water to yield the indicated solids concentration (NVM). $V_1$ for such bath was about five volts at 26.67°.

The resinous mixture was an acrylic resin made by adding mixtures of 60 parts of butyl acrylate, 25 parts of styrene, 15 parts of methacrylic acid, one part of t-butyl perbenzoate, one part of benzoyl peroxide, and 34.7 parts of 2-butoxy ethanol maintained at 157.2–160° during a 2½ hour period, then held for an additional hour in an agitated reactor equipped with a reflux condenser. The resulting resin then was further reacted for ½ hour at 154.4° with 10 parts of tris hydroxy methyl amino methane.

An apparatus and conditions like that of Example 1 were used, except that a "G" porosity 316 stainless steel plate was used as cathode for the cell chamber with about 17.6 liters per minute liquor circulation rate per square meter of cross-sectional circular cell area while the pressure differential across the cathode was lowered. At 15 volts differential the filtrate through the cathode had a 2.5% solids (NVM), and the flow rate through such cathode was about a fourth to a third of that tabulated for 8.8 volts in Example 1.

EXAMPLE 3

The following tests show the important effects of turbulence of liquor flow with respect to the deposition electrode surface. A metal cylinder 6 cm. in diameter by 10 cm. tall was filled to a depth of 5 cm. with the resinous binder concentrate of Example 1 which had been reduced with water to 10% solids (NVM). The flat bottom of the cylinder was wired as a cathode. The inside vertical walls were coated with electrical insulation. The resulting bath was at 26.67°.

The anode was a thin horizontal stainless steel disc, 5.7 cm. in diameter and centered in the cylinder 2.5 cm. above the cylinder bottom. All of the disc except an annulus 1.1 cm. wide on the bottom of the disc facing the cathode was coated with electrical insulation.

The disc was driven at variable speeds from overhead by a vertical shaft centered to the top of the disc and coated with electrical insulation to a height above the liquid level in the cylinder. Voltage above that for electrolysis was raised gradually at a constant rate until the flow of current between anode and cathode started to level off, indicating incipient accumulation or deposition of paint on the anode. The results are tabulated in Table II below:

TABLE II

| Speed of rotation of disc anode, r.p.m. | Amperes flowing between anode and cathode when incipient deposition was observed |
|---|---|
| 0 | 0.029 |
| 300 | 0.046 |
| 325 | 0.047 |
| 500 | 0.056 |
| 725 | 0.065 |
| 1200 | 0.084 |
| 1725 | 0.115 |

Resistance of the bath (measured with an ohmmeter and 1000 cycle A.C. current) was 62 ohms when the disc was stationary, and was about 115 ohms when the disc was running at 300 to 1,725 r.p.m. This may have been due to extension of electrical path between the electrodes in the cell. Cell conductance, of course, is necessary for the practice of this invention, and it started effectively just above the decomposition voltage of the aqueous liquor.

An additional important control effect can be demonstrated in the same device with the same paint bath. At a constant r.p.m. on the anode, the bath is maintained at 71.1° rather than 26.27° whereby the amperes (and thus the voltage) between anode and cathode at incipient deposition was substantially greater.

In another embodiment the invention can be applied to an electrocoating bath as a box or the like. Thus if a metal bath tank with anodic electrocoating paint dispersion is grounded to serve as a cathode for coating anode (with respect to said tank) objects, then a box with at least a substantial part of its wall area (if not all) being porous like the cathodes of the foregoing Examples 1 and 2 can be immersed in the bath and mounted to be electrically insulated from the bath tank except through bath conductance.

Such box is fitted with an outlet tube for liquid feeding to an aspirator or suction pump from the interior of the box. The foraminous wall area is charged cathodically (about 6–9 volts) with respect to the bath tank, and filtrate is drawn from the box interior. For analogous treating of cathodic electro-coating paint dispersions, the polarities of these electrical elements would, of course, be reversed. If necessary or desirable for treatment of a particular liquor, ionizable solute material (electrolyte) can be added thereto to increase cell conductance.

EXAMPLE 4

The apparatus used has been described in connection with FIG. 4 of the drawings.

Resinous binder like that described in Example 1 was dispersed with morpholine electrolyte in enough water to obtain a 5% (NVM) resin solids dispersion. The dispersion was circulated by pump from a reservoir into and out of the cylindrical cell zone containing the rotating anode and back to the reservoir at the rate of about 3.37 liter per minute per square meter of the circular cross-sectional area of the cell.

In a first set of runs the cathode plate used was a "G" grade, 3.18 mm. thick, A.I.S.I. 316 stainless steel porous plate of the Pall-Trinity Micro Corporation. Gauge pressure in the cell was from 5.2–15.5 cm. Hg. Back pressure on the downstream side of plate 55 (in tubing 57) was raised by throttling valve 58 to reduce the pressure differential across plate 55 to slightly less than about 5.2 cm. Hg. Anode rotation was 2500–3000 r.p.m. Table III summarizes the results.

At 240–250 volts incipient accumulation or deposition of resin was indicated by suppression of anode rotation.

The cathode plate was replaced with 3.18 cm. thick, A.I.S.I. 316 stainless steel porous plate having absolute porosity for liquids of about one micron, said plate furnished by the same supplier. A second set of runs was made at the same anode rotation rate while throttling valve 58 to reduce the pressure differential across the plate. Voltage from anode to cathode was 250 without apparent deposition of resin. Table IV summarizes the results.

TABLE III

| Voltage from anode to cathode | Cell liquor temp., °C. | Cathode filtrate flow, liters/sq. meter/hour | Resin removal from catholyte based on resin in initial feed liquor, percent | Amperes/ cm.² on cathode[1] |
|---|---|---|---|---|
| 140 | 37.78 | 36.7 | 42 | 0.0057 |
| 150 | 37.78 | 45 | 44 | 0.00645 |

[1] Based on superficial cathode surface of 25.6 square cm.

TABLE IV

| Cell liquor Temp., °C. | Approximate differential pressure, cm. Hg across cathode plate | Cathode filtrate flow, liters/ square meters per hour | Resin removal from catholyte based on resin in initial feed liquor, percent | Amperes/ cm.² on cathode[1] |
|---|---|---|---|---|
| 33.33 | 15.5 | 465 | 20 | .0018 |
| 35 | 10.3 | 202 | 26 | .0075 |
| 37.78 | 10.3 | 176 | 38 | .0118 |
| 40.56 | 5.2 | 57 | 70 | .0151 |
| 48.89 | (²) | 57 | 85 | .0269 |

[1] See footnote at end of Table III.
[2] Slightly less than 5.2.

EXAMPLE 5

A reservoir was filled with 200 grams of aqueous dispersion containing 98 grams of the resinous binder described in Example 1. The binder had been dispersed in water using morpholine, there being 79 milliequivalents of such amine per 100 grams of resin in the resulting aqueous dispersion. The aqueous dispersion was filtered before this testing. This dispersion was pumped at 2890 grams per minute into the cell apparatus described in FIGS. 5 and 6, out of the cell and back to the reservoir (not shown). The pressure in the cell, measured by manometer, was 37.7 cm. of mercury, gauge.

Initially bleed line 97 was shut off and at the initial temperature of 28.33° using a D.C. voltage of 100 volts between anode and cathode (rectified A.C. with about a 5% ripple factor) from a power source not shown, resin started to deposit on anode 86 and oozed therethrough into anode discharge (permeate) zone or chamber 93 as a mixture of resin and cell liquid where it was drawn off. Amperage did not fall off, but remained fairly constant. In two minutes the cell temperature raised itself to 31.11°, and voltage was raised to 200 between anode and cathode, and amperage increased and stayed fairly steady. Indirect cooling was put on the circulating liquor after about ½ hour to arrest temperature rise. At the end of 45 minutes the anode seemed to plug somewhat at about 37.78° to 40° with amperage tending to drop. It became evident that a higher temperature would be helpful to prevent plugging. The temperature then was raised to 48.89°, the temperature being taken in the anode discharge zone by a thermocouple not shown, and a small bleed through outlet 97 was established. Thereafter the apparatus operated quite smoothly and the voltage was raised at two hours and fifty-five minutes to 250 volts between anode and cathode with amperage increase and thereafter amperage remained fairly steady. Anode chamber 93 filled with a mixture of aqueous resin concentrate with the resin tending to settle out by gravity to yield an approximately 50% NVM resinous mixture for withdrawal. This mixture was drained through outlets 96 and 99 into a container (not shown) for settling.

As the run progressed, the resin solids were depleted in the liquor in the reservoir, and the milliequivalents of amine per 100 grams of resin increased in this liquor. The table below summarizes the operation.

TABLE V

| Elapsed time | Temp., °C. | Resin solids in reservoir, total grams | Milliequivalents of amine in reservoir per 100 grams resin |
|---|---|---|---|
| 0 | 28.33 | 98 | 79 |
| 2 min | 31.11 | | |
| 45 min | 40 | 76 | 99 |
| 1¼ hrs | 48.89 | 64 | 113 |
| 1 hr 55 min | | 60 | 117 |
| 2 hrs. 55 min | 39.44 | 54 | 130 |

EXAMPLE 6

Additional tests are made to determine film and bath resistivity on the anode at various temperatures with unpigmented resin dispersions of Example 5 at 10% solids concentration NVM, as well as rate of deposition. These tests show as follows:

TABLE VI

| Bath temp., °C. | Film resistance, ohms/cm. ²/ micron of dried film thickness [1] | Bath resistance, ohms/ centimeter | Rate of deposition-gms. of resin/cm. ² superficial anode, surface/hour [2] |
|---|---|---|---|
| 26.67 | 8,500 | 502 | 0.066 |
| 37.78 | 2,550 | 433 | 0.150 |
| 48.89 | 950 | 364 | 0.276 |
| 60 | 370 | 311 | 0.572 |
| 71.11 | 230 | 257 | 1.122 |

[1] About 6% less than deposited wet film thickness.
[2] In these tests the anode was nonporous.

The voltage applied was 100 volts for time to pass 33 coulombs. At 65.56–71.11° the resin tended to slough off and float from the anode. For rapid deposition without sloughing, the best operating temperature was about 54.44–60° with a current density of about 3/10 of an ampere per square centimeter of this solid anode surface.

From Examples 5 and 6 as a basis of design, a 1% nonvolatile content rinse water dispersion of the resin of Example 1 at 71.11° will produce about a kilo of reclaimed resin solids per 105 kilos of bath and leave about 104 liters of treated liquor using a 930 square cm. superficial area anode in cell apparatus similar to that of Example 5 in a one-hour operation. Superficial anode surface is merely the cross-sectional area of the anode exposed to the cell and not accounting for irregularities or porosity.

While the foregoing examples have described treatment of aqueous electrocoating paint compositions containing an amine as an ionizing electrolyte for the resin, it should be understood that others bases, e.g., those containing potassium, sodium, lithium, aqua ammonia, and mixtures of such bases with amines and each other are suitable for similar processing.

EXAMPLE 7

Apparatus like that depicted in FIG. 8 was fed with wash water (pH 4.8–5.8) from the centrifuging operations in the refining of a vegetable oil. A yellow-orange anolyte, having pH of 1.9–2.2, was continuously withdrawn (containing the bulk of the hexane extractable material in the feed liquor, principally triglyceride fats and free fatty acids). A clear catholyte was continuously withdrawn having pH of 11.3–12.4, and it was virtually free of hexane extractables.

EXAMPLE 8

The apparatus was basically like that of FIG. 7 and the feed liquor was a waste aqueous cutting fluid containing 7% emulsified oil, predominantly petroleum oil. The anolyte flow was an oleoaginous/aqueous mixture from which a supernatant oil layer separated. The catholyte flow contained 0.2–0.5% oil.

While the foregoing examples show manually-controlled operations, it will be evident to one skilled in the art that automatic control can be used. Thus, in an operation similar to those of Examples 1, 2 and 4, pressure drop across the microporous electrode can be controlled by one or more automatic throttling valves responsive to a desired, predetermined pressure differential, or, within reasonable limits, to quality or volume of permeate sought. Similarly, amperage attenuation can be arrested in such situations by reducing operating voltage, increasing relative motion between the cell liquor and the deposition electrode, and/ or raising the cell or deposition electrode temperature. While amperage can fluctuate moderately, e.g., undulate without steadily or suddenly decreasing, without special detriment to a sustained operation, particularly in one like Example 5 where an electrodeposit is being forced through a microporous deposition electrode, it is desirable to operate at a virtual equilibrium. Amperage fluctuaton in such exemplary operation can signal for manual or automatic change in flow rate through the porous deposition electrode, warming or cooling such electrode, and/ or adjusting operating voltage to dampen such fluctuation.

What is claimed is:

1. In a process for treating electrically-conductive liquor in a pressure cell zone having opposed electrodes externally powered with electric current passing through said liquor therebetween, wherein at least one of said electrodes is a microporous product discharge electrode that is permeable to said liquor, forms a boundary area of said cell zone, and communicates by its permeability with a permeate collection zone, the improvement which comprises:

feeding said cell zone with a feed liquor which contains dissolved electrolyte and provides a fluent electrodeposit on one of said electrodes as a deposition electrode at a minimum voltage $V_1$ across said electrodes, said electrodeposit having electrical conductivity lower than said liquor;

applying voltage across said electrodes in excess of $V_1$;

continuously removing resulting fluent electrodeposit from said deposition electrode at a rate effective for maintaining substantially unattenuated electric current flow between said electrodes at a voltage thereacross in excess of $V_1$; and collecting the permeate that flows through said microporous product discharge electrode or electrodes into the permeate collection zone communicating therewith.

2. The process of claim 1 wherein a high relative movement is maintained between said deposition electrode and liquor in said cell zone, and liquid enriched in dissolved electrolyte is forced through said porous electrode and into the permeate collection zone communicating therewith for withdrawal.

3. The process of claim 2 wherein said deposition electrode is moving rapidly.

4. The process of claim 2 wherein an exterior surface of said deposition electrode is flushed with liquor.

5. The process of claim 2 wherein the deposition electrode is flushed from a hollow interior with a flow of inlet feed liquor passing out through pores in said deposition electrode.

6. The process of claim 1 wherein said liquor is depleted with respect to material therein which provides said fluent electrodeposit by causing said electrodeposit to form on said deposition electrode that is microporous and permeable to said electrodeposit and forcing said electrodeposit as a cell liquor-bearing permeate through said deposition electrode.

7. The process of claim 1 wherein said feed liquor is simultaneously depleted with respect to material therein which provides said fluent electrodeposit by causing said electrodeposit to form on said deposition electrode that is microporous and permeable to said electrodeposit and forcing said electrodeposit as a cell liquor-bearing permeate through said deposition electrode, and depleted with respect to dissolved electrolyte by forcing liquid enriched in dissolved electrolyte through an electrode opposed to said deposition electrode, said opposed electrode being microporous and permeable to said liquid.

8. The process of claim 1 wherein said deposition electrode is maintained sufficiently warm to assist in establishing or maintaining fluency of said electrodeposit.

9. The process of claim 1 wherein said deposition electrode is anodic with respect to its opposed electrode.

10. The process of claim 1 wherein said deposition electrode is cathodic with respect to its opposed electrode.

11. The process of claim 1 wherein said feed liquor is aqueous and contains an electrocoating paint binder.

12. The process of claim 11 wherein said feed liquor is a rinse water from an electrocoating process.

13. The process of claim 11 wherein said feed liquor is an electrocoating bath dispersion.

14. The process of claim 1 wherein the feed liquor is aqueous and the voltage maintained across said electrodes is at least about three volts.

15. The process of claim 1 wherein said feed liquor contains electrodepositable oleoaginous substance.

References Cited

UNITED STATES PATENTS

| | | | |
|---|---|---|---|
| 1,435,886 | 11/1922 | Acton et al. | 204—180 R |
| 1,603,298 | 10/1926 | Speed | 204—180 R |
| 2,273,036 | 2/1942 | Heise et al. | 204—284 X |
| 2,900,320 | 8/1959 | Metcalfe et al. | 204—180 RX |
| 2,944,952 | 7/1960 | McMinn, Jr. | 204—180 R |
| 3,113,048 | 12/1963 | Thompson | 204—284 X |
| 3,436,326 | 4/1969 | Stober | 204—180 R |
| 3,506,562 | 4/1970 | Coackley | 204—180 RX |

ARTHUR C. PRESCOTT, Primary Examiner

U.S. Cl. X.R.

204—152, 300